US007983025B2

(12) United States Patent
Ger et al.

(10) Patent No.: US 7,983,025 B2
(45) Date of Patent: Jul. 19, 2011

(54) DRIVING DEVICE FOR DRIVING DISCHARGE LAMPS AND ELECTRONIC DEVICE EMPLOYING THE SAME

(75) Inventors: Chih-Chan Ger, Taipei Hsien (TW); Chi-Wen Kan, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1237 days.

(21) Appl. No.: 11/616,885

(22) Filed: Dec. 28, 2006

(65) Prior Publication Data

US 2008/0088247 A1 Apr. 17, 2008

(30) Foreign Application Priority Data

Oct. 13, 2006 (CN) ...................... 2006 2 0015210 U

(51) Int. Cl.
*H02B 1/26* (2006.01)

(52) U.S. Cl. ........ 361/651; 361/644; 361/627; 361/622; 361/600

(58) Field of Classification Search .................. 315/363, 315/312–324; 361/651, 600, 601, 622, 623, 361/644, 627
See application file for complete search history.

(56) References Cited

U.S. PATENT DOCUMENTS

| | | | | |
|---|---|---|---|---|
| 7,696,704 | B2 * | 4/2010 | Ger et al. | 315/312 |
| 2005/0269976 | A1 | 12/2005 | Chou et al. | |
| 2007/0190890 | A1 * | 8/2007 | Hsu et al. | 445/69 |

* cited by examiner

*Primary Examiner* — Tuyet Thi Vo
(74) *Attorney, Agent, or Firm* — Wei Te Chung

(57) ABSTRACT

A driving device (100) for driving a plurality of discharge lamps (14), and includes a controller board (11), a connecting board (15), and a group of high voltage lines (17). The controller board includes a controller circuit (13) for converting a received signal to a high voltage signal suitable to drive the plurality of discharge lamps. The connecting board includes a balance circuit for balancing currents flowing through the plurality of discharge lamps. The connecting board is substantially perpendicular to the controller board. The high voltage lines are connected to the controller board and the connecting board, and the high voltage signal from the controller circuit is output to the balance circuit via the high voltage lines.

19 Claims, 10 Drawing Sheets

DRIVING DEVICE FOR DRIVING DISCHARGE LAMPS AND ELECTRONIC DEVICE EMPLOYING THE SAME

BACKGROUND OF THE INVENTION

1. Field of the Invention

The invention relates to electronic driving devices, and particularly to a driving device for driving discharge lamps of a liquid crystal display (LCD) panel.

2. Description of Related Art

Conventionally, a liquid crystal display (LCD) panel uses discharge lamps, such as cold cathode fluorescent lamps (CCFLs), as a light source thereof. Typically, an inverter circuit is employed to provide alternating current (AC) signals to drive the CCFLs.

FIG. 5A is a conventional electronic device 50, and FIG. 5B is a side view along direction D of FIG. 5A. The electronic device 50 includes an LCD panel 510 and a driving device. The driving device is used for driving a plurality of discharge lamps 54 disposed in parallel on the LCD panel 510 (shown in FIG. 5B), and includes a controller board 51. The controller board 51 is fixed with a plurality of connectors 522, a balance circuit 52, and a controller circuit 53. The balance circuit 52 includes a plurality of inductors 521 connected to the discharge lamps 54.

The controller circuit 53 is provided for converting a received signal to a high voltage signal that can drive the discharge lamps 54. The balance circuit 52 is connected to the controller circuit 53, for balancing currents flowing through the discharge lamps 54. The controller board 51 is connected to the discharge lamps 54 via the connectors 522.

The driving device converts a direct current (DC) signal output from a circuit (not shown) into an alternating current (AC) signal for driving the discharge lamps 54. This conventional driving device of FIG. 5A is a low-voltage driving device.

Another conventional driving device is similar to the conventional driving device in FIG. 5A, except that the driving device further includes a power factor correction (PFC) circuit. The PFC circuit directly receives a main supply AC signal (e.g. 220V in China, and 110V in America), and converts the AC signal to a DC signal (about 400V) to drive the discharge lamps. The driving device is a high-voltage driving device.

At present, in testing LCD panels during manufacturing, manufacturers must integrate the driving devices with the panels otherwise repeated connection and disconnection of an external driving device may affect the integrity of the panels under test. However, for manufactures specializing in LCD panels, the necessity of including driving devices is cumbersome and expensive in the manufacturing process. What is needed is a way for panel manufactures to test the LCD panel without having to integrate driving devices in the panel and without affecting the quality of the panel with current external driving device test equipment.

Therefore, a heretofore unaddressed need exists in the industry to overcome the aforementioned deficiencies and inadequacies.

SUMMARY OF THE INVENTION

In one aspect of the present invention, a driving device for driving a plurality of discharge lamps, includes a controller board, a connecting board, and a group of high voltage lines. The controller board includes a controller circuit for converting a received signal to a high voltage signal suitable to drive the plurality of discharge lamps. The connecting board includes a balance circuit for balancing currents flowing through the plurality of discharge lamps. The connecting board is substantially perpendicular to the controller board. The high voltage lines are connected to the controller board and the connecting board, and the high voltage signal from the controller circuit is output to the balance circuit via the high voltage lines.

In another aspect of the present invention, a driving device for driving a plurality of loads, includes a controller board, a connecting board, and a group of high voltage lines. The controller board is configured with a controller circuit thereon for converting a received signal to a high voltage signal to drive the plurality of loads. The connecting board is fixed with a balance circuit thereon for balancing currents flowing through the plurality of loads. The connecting board is parallel to the controller board. The high voltage lines electronically connect the controller board to the connecting board, and the high voltage signal from the controller circuit is output to the balance circuit via the high voltage lines.

In another aspect of the present invention, an electronic device includes a panel and a driving device. The driving device for driving a plurality of loads, and includes a controller board, a connecting board, and a group of high voltage lines. The controller board includes a controller circuit for converting a received signal to a high voltage signal to drive the plurality of loads. The connecting board includes a balance circuit for balancing currents flowing through the plurality of loads. The connecting board is separate from the controller board. The high voltage lines are connected to the controller board and the connecting board, and the high voltage signal of the controller circuit is output to the balance circuit via the high voltage lines.

Other advantages and novel features will become more apparent from the following detailed description when taken in conjunction with the accompanying drawings, in which:

DETAILED DESCRIPTION OF THE INVENTION

Figure 1A:
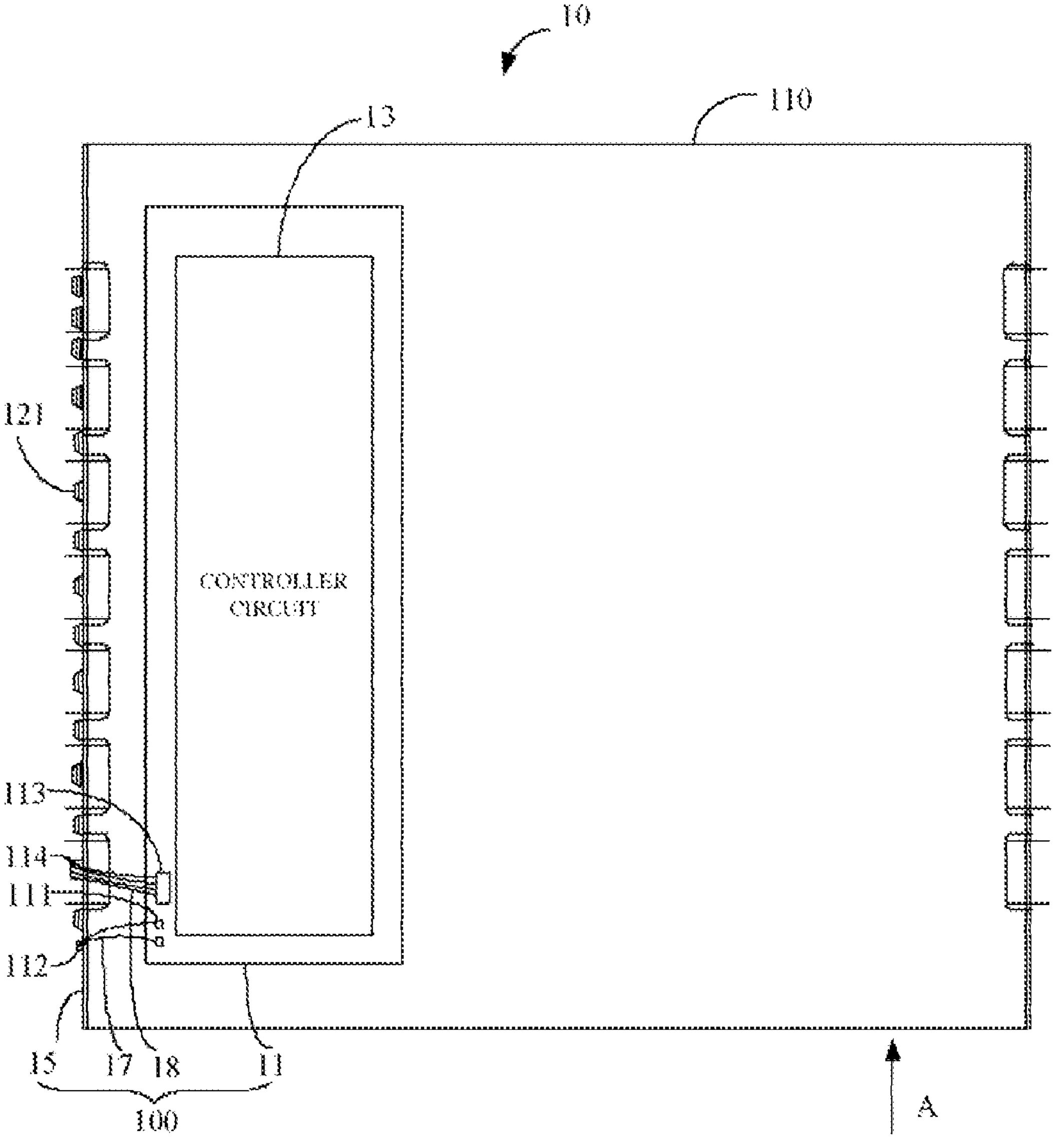
FIG. 1A is an electronic device of an exemplary embodiment of the present invention.
Figure 1B:
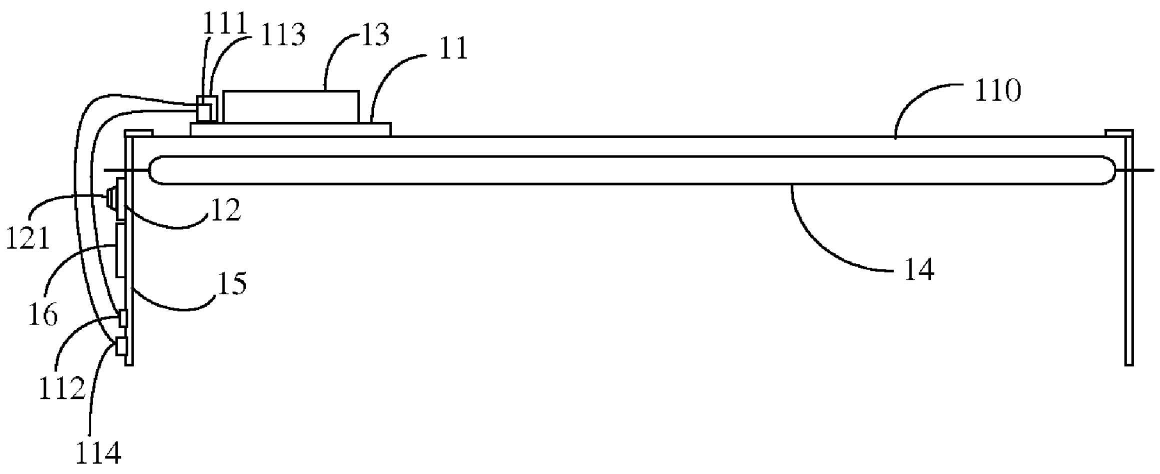
FIG. 1B is a side view along direction A of FIG. 1A.

FIG. 1A is an electronic device 10 of an exemplary embodiment of the present invention, and FIG. 1B is a side view along direction A of FIG. 1A. The electronic device 10 includes a panel 110 and a driving device 100. The driving device 100 for driving a plurality of loads 14 (shown in FIG. 1B) is disposed in parallel on the panel 110. In the exemplary embodiment, the loads 14 are discharge lamps. The driving device 100 includes a controller board 11, a connecting board 15, a group of high voltage lines 17, and a group of protection lines 18. The controller board 11 includes a first connector 111 and a third connector 113. A controller circuit 13 is also disposed on the controller board 11. The connecting board 15 includes a second connector 112 and a fourth connector 114. A balance circuit 12 including a plurality of inductors 121 and a protection circuit 16 are also disposed on the connecting board 15. The connecting board 15 is separate from the controller board 11. In the exemplary embodiment, the connecting board 15 is perpendicular to the controller board 11. The plurality of inductors 121 are connected to the plurality of loads 14. In the exemplary embodiment, the panel 110 is a liquid crystal display panel.

The controller circuit 13 converts a received signal to a high voltage signal for driving the plurality of loads 14. The balance circuit 12 balances currents flowing through the plurality of loads 14. The high voltage lines 17 electrically connect the controller board 11 and the connecting board 15, that is, two ends of the high voltage lines 17 are respectively connected to the first connector 111 disposed on the controller board 11 and the second connector 112 disposed on the connecting board 15. Therefore, the high voltage signal of the controller board 11 is output to the connecting board 15 via the high voltage lines 17. In the exemplary embodiment, the high voltage lines 17 include high-level lines and low-level lines.

In other exemplary embodiments, the high voltage lines 17 are soldered to the controller board 11 and the connecting board 15. Thus, the first connector 111 and the second connector 112 are eliminated.

The protection circuit 16 outputs a protection signal to the controller circuit 13, for controlling output of the controller circuit 13. Two ends of the protection lines 18 are respectively connected to the third connector 113 disposed on the controller board 11 and the fourth connector 114 disposed on the connecting board 15, and thus, the protection lines 18 are connected between the controller board 11 and the connecting board 15. If one or more of the plurality of loads 14 is working abnormally because of a fault, such as a short circuit or an open, the protection circuit 16 can output a protection signal to the controller circuit 13 via the protection lines 18 to protect the driving device 100.

In other exemplary embodiments, the protection lines 18 are soldered to the controller board 11 and the connecting board 15, and thus, the first connector 111 and the second connector 112 are eliminated.

In the exemplary embodiment, the driving device 100 is a low-voltage driving device. A high voltage electrode end of the plurality of loads is soldered to the connecting board 15, and a low voltage electrode end is connected via a plurality of connecting lines. Therefore, production costs are reduced, and it is easy to assemble the driving device 100.

Figure 2A:
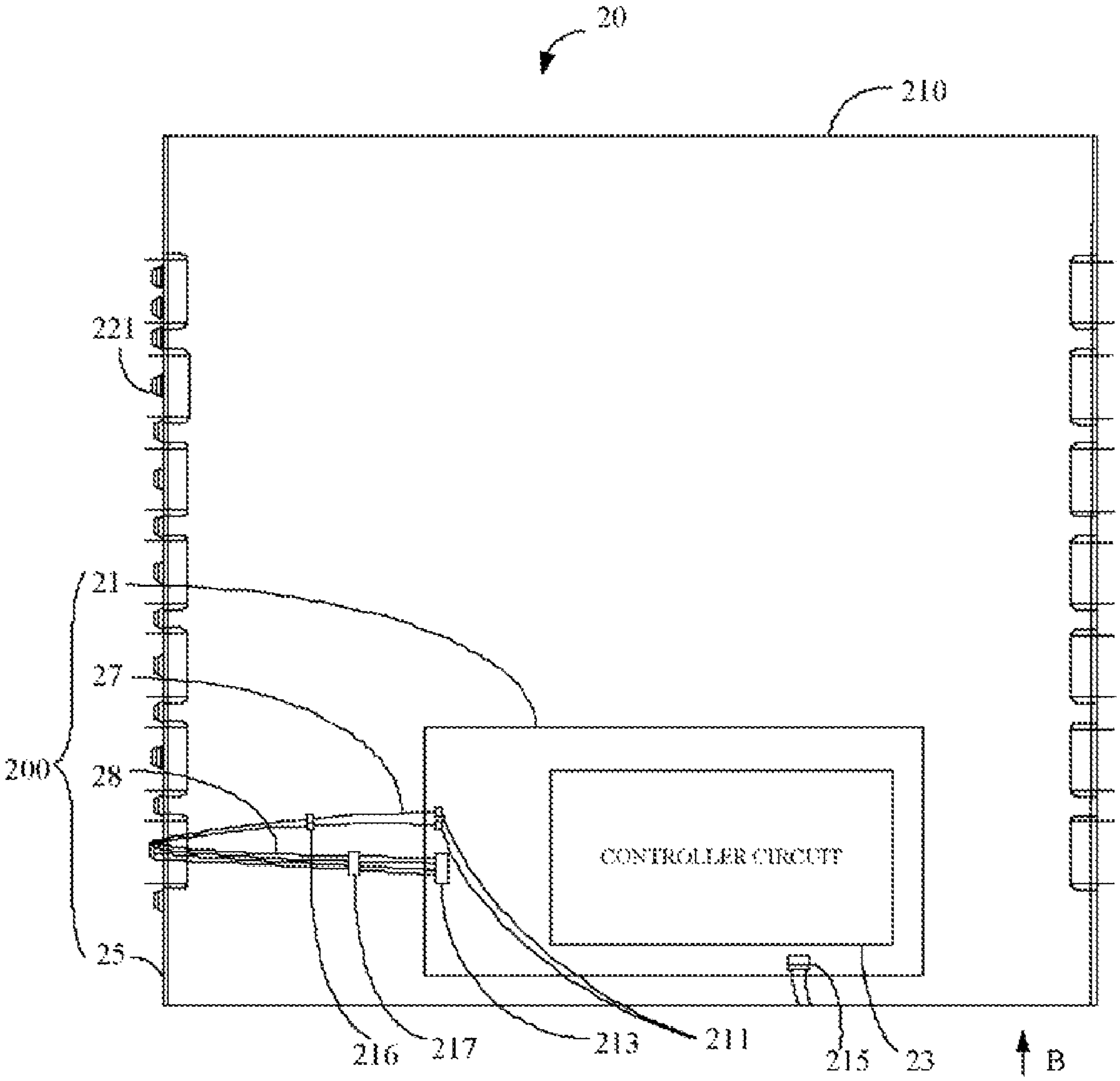
FIG. 2A is an electronic device of another exemplary embodiment of the present invention.
Figure 2B:
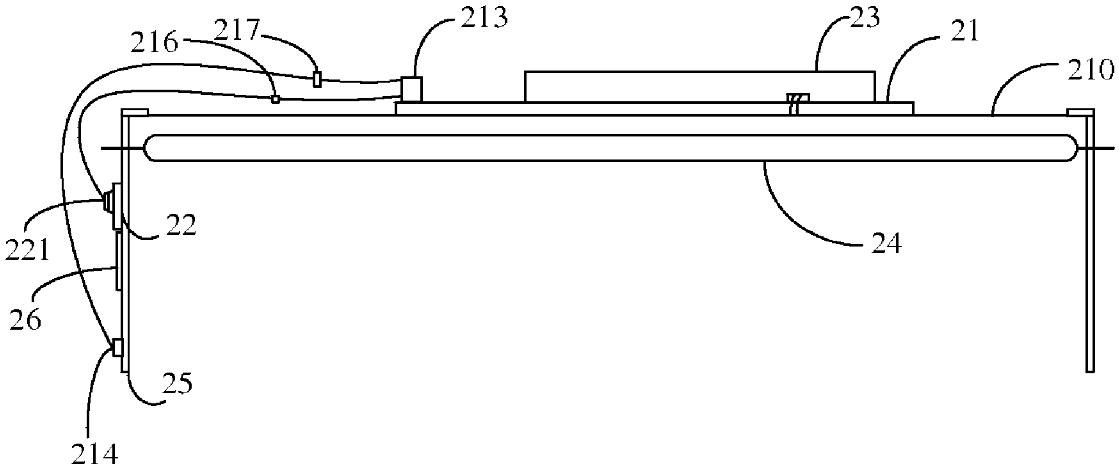
FIG. 2B is a side view along direction B of FIG. 2A.

FIG. 2A is an electronic device 20 of another exemplary embodiment of the present invention, and FIG. 2B is a side view along direction B of FIG. 2A. The electronic device 20 is similar to the electronic device 10 of FIG. 1A, except that the driving device 200 is a high-voltage driving device. The controller board 21 further includes a fifth connector 215, and is connected to a main supply (e.g. 220V in China, and 110V in America) via the fifth connector 215. The driving device 200 further includes a sixth connector 216 and a seventh connector 217.

One end of the high voltage lines 27 is connected to the controller board 21 via the first connector 211, and the other end of the high voltage lines 27 is soldered to the connecting board 25 via the sixth connector 216. In the exemplary embodiment, the sixth connector 216 includes a male connector and a female connector. One end of the protection lines 28 is connected to the controller board 21 via the third connector 213, and the other end of the protection lines 28 is connected to the fourth connector 214 of the connecting board 25 via the seventh connector 217. In the exemplary embodiment, the seventh connector 217 includes a male connector and a female connector. In other exemplary embodiments, the sixth connector 216 and the seventh connector 217 are eliminated.

Figure 3A:
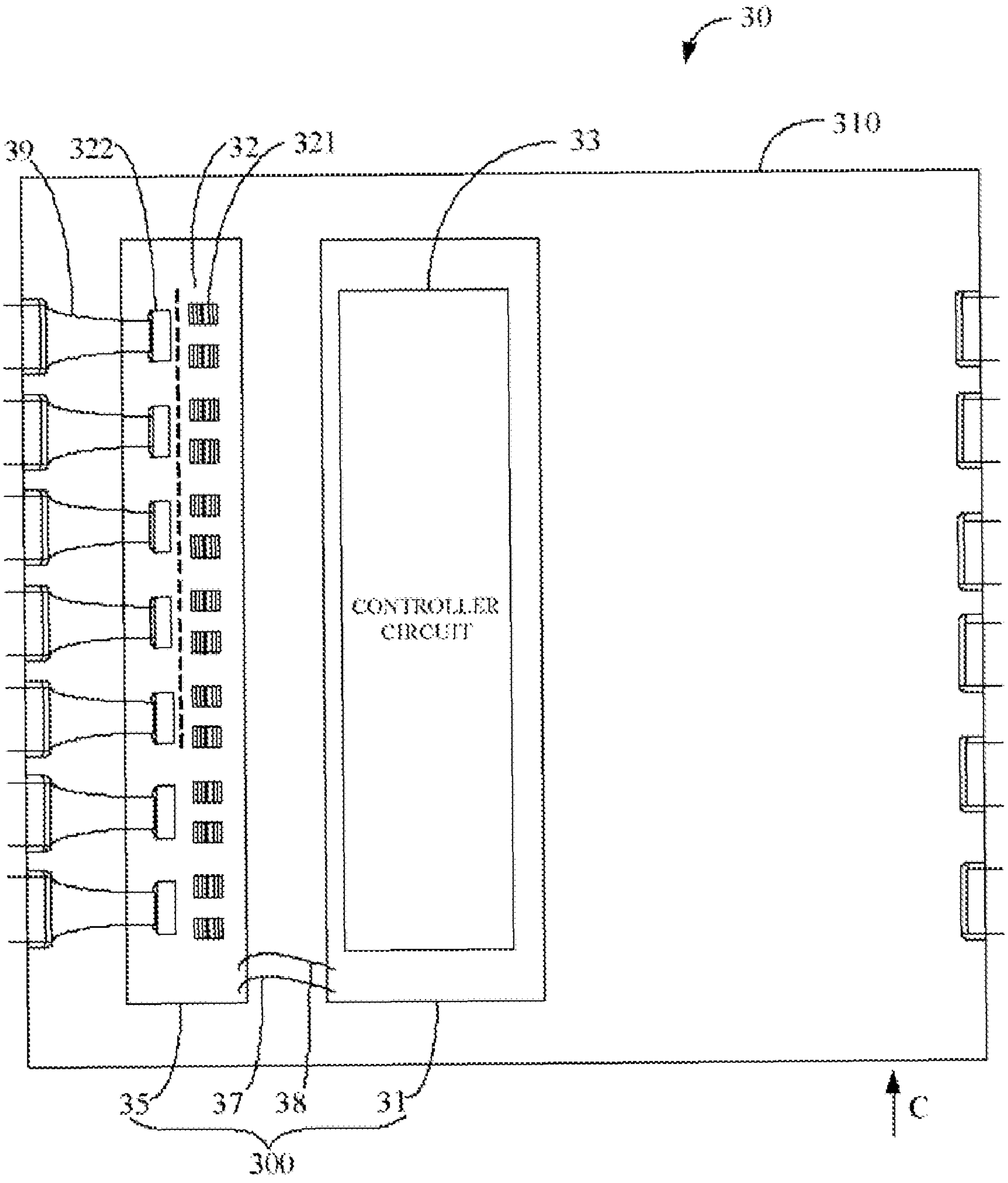
FIG. 3A is an electronic device of a further exemplary embodiment of the present invention.
Figure 3B:
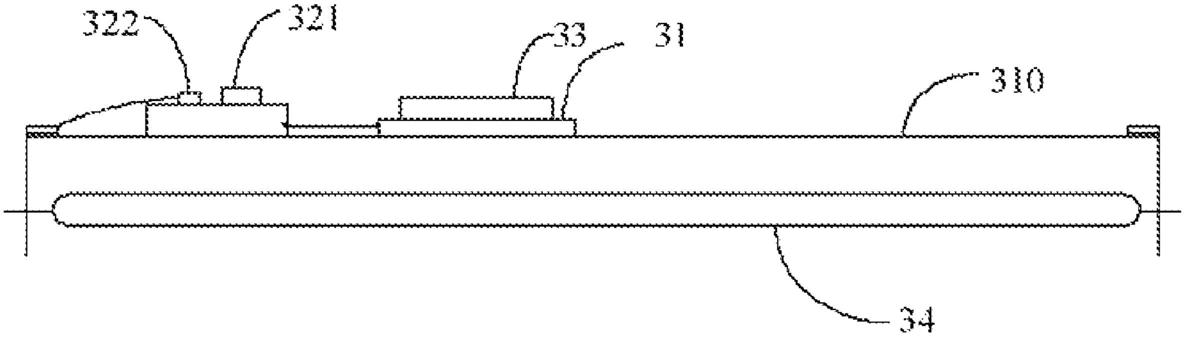
FIG. 3B is a side view along direction C of FIG. 3A.

FIG. 3A is an electronic device 30 of a further exemplary embodiment of the present invention, and FIG. 3B is a side view along direction C of FIG. 3A. The electronic device 30 is similar to the electronic device 10 of FIG. 1A, except that the connecting board 35 and the controller board 31 of the driving device 300 of the electronic device 30 are coplanar and adjacent to each other. In the exemplary embodiment, the high voltage lines 37 and the protection lines 38 are soldered to the controller board 31 and the connecting board 35. The connecting board 35 further includes a plurality of connectors 322, and is connected to the plurality of loads 34 via the plurality of connectors 322. In the exemplary embodiment, the connecting board 35 has four layers, and can save space in the panel 310. In other exemplary embodiments, the controller board 31 is connected to the connecting board 35 via a plurality of connectors, high voltage lines, and protection lines.

Figure 4A:
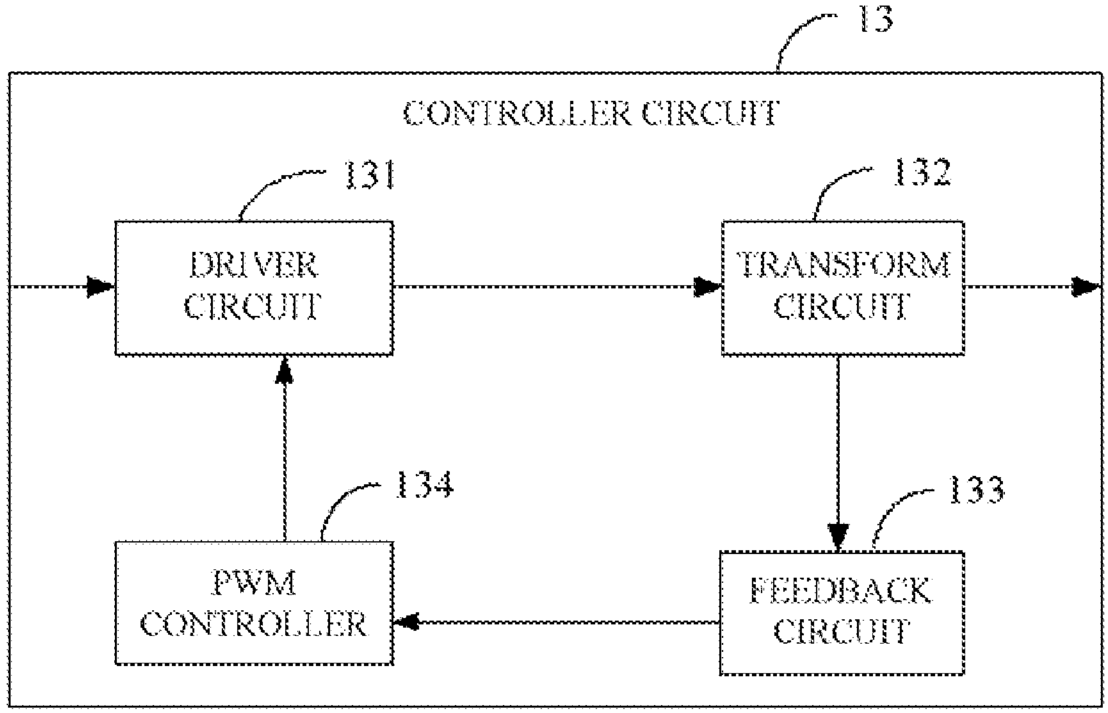
FIG. 4A is a block diagram of a controller circuit of FIG. 1A.

FIG. 4A is a block diagram of the controller circuit 13 of FIG. 1A. The controller circuit 13 includes a driver circuit 131, a transformer circuit 132, a feedback circuit 133, and a pulse width modulation (PWM) controller 134. The driver circuit 131 converts a received signal to an alternating current (AC) signal. The transformer circuit 132 is connected to the driver circuit 131, and converts the AC signal to the high voltage signal for driving the plurality of loads 14. In the exemplary embodiment, the received signal received by the driver circuit 131 is a direct current (DC) signal (about 24V), the AC signal output from the driver circuit 131 is a square wave signal, and the high voltage signal output from the transformer circuit 132 is a sine wave signal. The feedback circuit 133 is connected between the transformer circuit 132 and the PWM controller 134, and feeds back the currents flowing through the plurality of loads 14. The PWM controller 134 is connected to the switch driver circuit 131, and controls output of the driver circuit 131. In the exemplary embodiment, the transformer circuit 132 includes at least one transformer (not shown), and each transformer is connected to at least two loads 14.

Figure 4B:
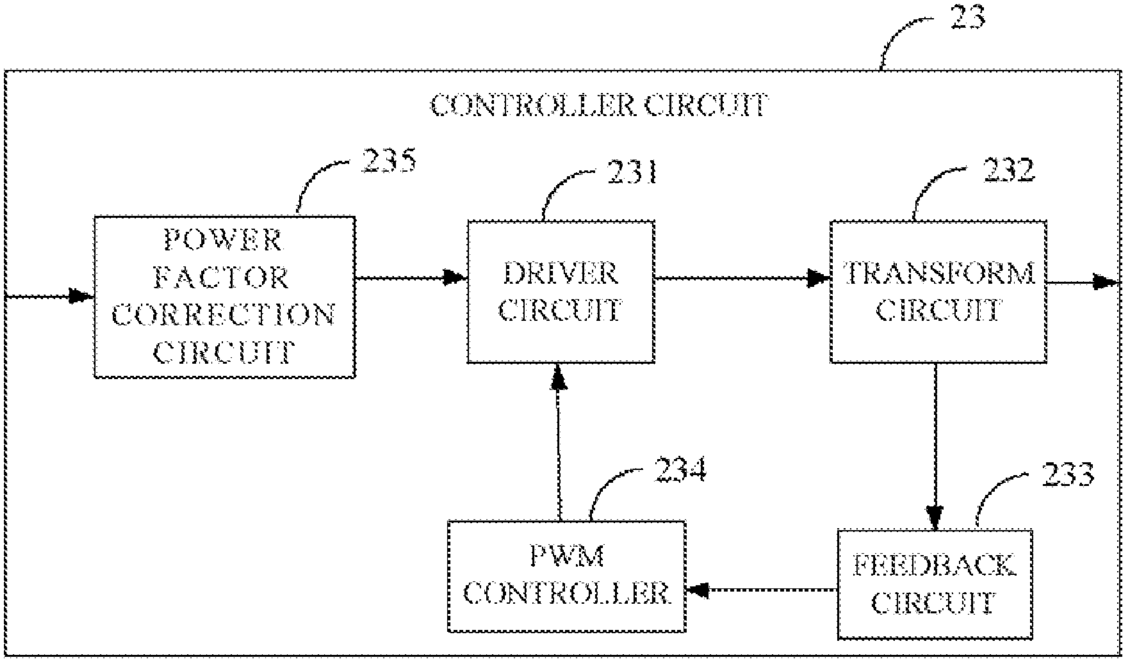
FIG. 4B is a block diagram of a controller circuit of FIG. 2A.
Figure 5A:
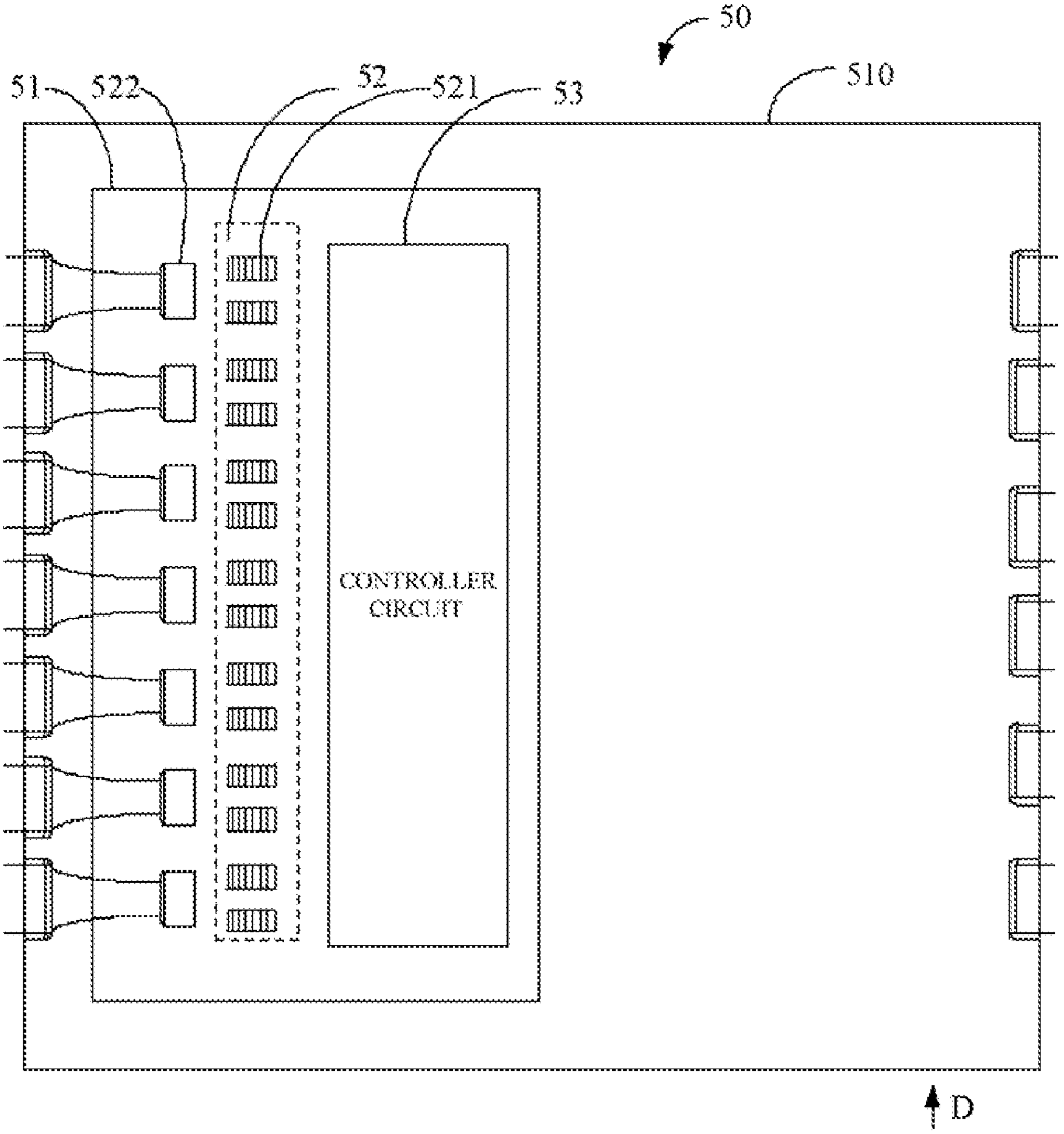
FIG. 5A (RELATED ART)
FIG. 5A is a conventional electronic device.
Figure 5B:
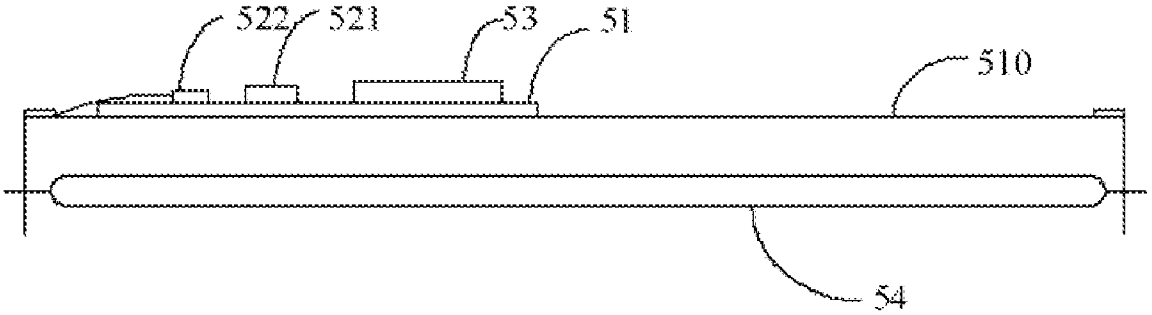
FIG. 5B (RELATED ART)
FIG. 5B is a side view along direction D of FIG. 5A.

FIG. 4B is a block diagram of the controller circuit 23 of FIG. 2A. The controller circuit 23 is similar to the controller circuit 13 of FIG. 4A, except that the controller circuit 23 further includes a power factor correction circuit 235. The power factor correction circuit 235 is connected to the switch driver circuit 231, for converting a received signal to a DC signal, and correcting power factors of the controller circuit 23. In the exemplary embodiment, the received signal is mains supply AC voltage.

The driving devices 100, 200, 300 are simple and cost effective to build and allow for externally providing high-voltage or low-voltage signals for testing LCD panels without negatively effecting integrity of the LCD panels. Panel manufacturers can sell the panels 110, 210, 310, with only the connecting boards 15, 25, 35 with the balance circuit 12, 22, 32 included, but without the controller board 11 with the controller circuit 13. Therefore, cost of the panels 110, 210, 310 is reduced. Finished product manufacturers receiving the LCD panels as depicted above, can freely select a low-voltage driving mode or a high-voltage driving mode for the electronic device employing one of the panels.

While exemplary embodiments have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A driving device for driving a plurality of discharge lamps, comprising:

a controller board, comprising a controller circuit for converting a received signal to a high voltage signal suitable to drive the plurality of discharge lamps;

a connecting board substantially perpendicular to the controller board, comprising a balance circuit comprising a plurality of conductors connecting with the corresponding discharge lamps for balancing currents flowing through the plurality of discharge lamps; and a group of high voltage lines connected to the controller board and the connecting board, wherein the high voltage signal from the controller circuit is output to the balance circuit via the high voltage lines.

2. The driving device of claim 1, further comprising a first connector disposed on the controller board and a second connector disposed on the connecting board, and two ends of the high voltage lines respectively connected to the first connector and the second connector.

3. The driving device of claim 1, further comprising a protection circuit disposed on the connecting board, for outputting a protection signal to the controller circuit and protecting the driving device.

4. The driving device of claim 3, further comprising a group of protection lines electronically connecting the controller board and the connecting board, and the protection signal from the protection circuit output to the controller circuit via the protection lines.

5. The driving device of claim 4, further comprising a third connector disposed on the controller board and a fourth connector disposed on the connecting board, and two ends of the protection lines respectively connected to the third connector and the fourth connector.

6. The driving device of claim 1, wherein the controller circuit comprises:

a driver circuit, for converting the received signal to an alternating current (AC) signal;

a transformer circuit connected to the driver circuit, for converting the AC signal to the high voltage signal for driving the plurality of loads; and a pulse width modulation (PWM) controller connected to the driver circuit, for controlling output of the switch driver circuit.

7. The driving device of claim 6, wherein the controller circuit further comprises a feedback circuit, connected between the transformer circuit and the PWM controller, for feeding back the currents flowing through the plurality of loads.

8. The driving device of claim 6, wherein the controller circuit further comprises a power factor correction circuit, connected to the driver circuit, for converting a received signal to a direct current (DC) signal and correcting power factors of the controller circuit.

9. A driving device, for driving a plurality of loads, comprising:

a controller board, configured with a controller circuit thereon for converting a received signal to a high voltage signal to drive the plurality of loads;

a connecting board, fixed with a balance circuit thereon comprising a plurality of conductors connecting with the corresponding loads for balancing currents flowing through the plurality of loads, the connecting board parallel to the controller board; and a group of high voltage lines, electrically connecting the controller board to the connecting board;

wherein the high voltage signal from the controller circuit is output to the balance circuit via the high voltage lines.

10. The driving device of claim 9, further comprising a protection circuit disposed on the connecting board, for outputting a protection signal to the controller circuit and protecting the driving device.

11. The driving device of claim 10, further comprising a group of protection lines electrically connecting the controller board and the connecting board, and the protection signal of the protection circuit output to the controller circuit via the protection lines.

12. The driving device of claim 9, wherein the controller circuit comprises:

a driver circuit, for converting the received signal to an alternating current (AC) signal;

a transformer circuit connected to the driver circuit, for converting the AC signal to the high voltage signal for driving the plurality of loads; and a pulse width modulation (PWM) controller connected to the driver circuit, for controlling outputs of the switch driver circuit.

13. The driving device of claim 12, wherein the controller circuit further comprises a feedback circuit, connected between the transformer circuit and the PWM controller, for feeding back the currents flowing through the plurality of loads.

14. The driving device of claim 12, wherein the controller circuit further comprises a power factor correction circuit, connected to the driver circuit, for converting a received signal to a direct current (DC) signal and correcting power factors of the controller circuit.

15. An electronic device, comprising:

a panel;

a driving device, for driving a plurality of loads parallel disposed on the panel, the driving device comprising:

a controller board, comprising a controller circuit for converting a received signal to a high voltage signal to drive the plurality of loads;

a connecting board, comprising a balance circuit comprising a plurality of conductors connecting with the corresponding loads for balancing currents flowing through the plurality of loads; in which, the connecting board is separated to the controller board; and a group of high voltage lines, electrically connecting the controller board to the connecting board, the high voltage signal of the controller circuit output to the balance circuit via the high voltage lines.

16. The electronic device of claim 15, further comprising a protection circuit disposed on the connecting board, for outputting a protection signal to the controller circuit and protecting the driving device.

17. The electronic device of claim 16, further comprising a group of protection lines connected to the controller board and the connecting board, and the protection signal of the protection circuit output to the controller circuit via the protection lines.

18. The electronic device of claim 15, wherein the controller circuit comprises:

a driver circuit, for converting the received signal to an alternating current (AC) signal;

a transformer circuit connected to the driver circuit, for converting the AC signal to the high voltage signal for driving the plurality of loads;

a pulse width modulation (PWM) controller connected to the driver circuit, for controlling outputs of the driver circuit; and a feedback circuit, connected between the transformer circuit and the PWM controller, for feeding back the currents flowing through the plurality of loads.

19. The electronic device of claim 18, wherein the controller circuit further comprises a power factor correction circuit, connected to the driver circuit, for converting a received signal to a direct current (DC) signal and correcting power factors of the controller circuit.

* * * * *